C. W. BEISER.
MOISTENER FOR STAMPS, ENVELOPES, TAPE, ETC.
APPLICATION FILED JUNE 7, 1921.
1,429,058. Patented Sept. 12, 1922.
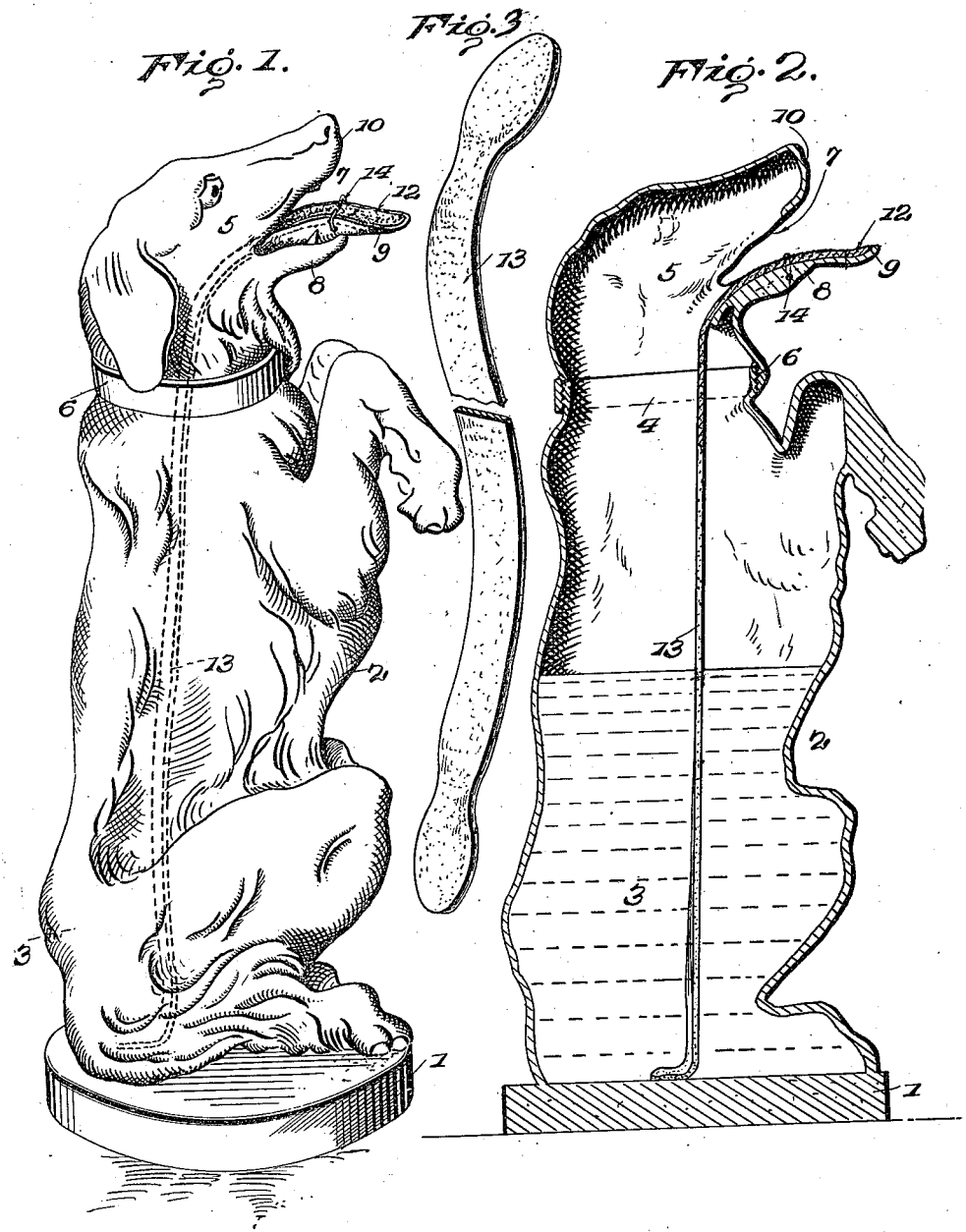

Patented Sept. 12, 1922.

1,429,058

UNITED STATES PATENT OFFICE.

CHARLES WILLIAM BEISER, OF BROOKLYN, NEW YORK.

MOISTENER FOR STAMPS, ENVELOPES, TAPE, ETC.

Application filed June 7, 1921. Serial No. 475,694.

*To all whom it may concern:*

Be it known that I, CHARLES WILLIAM BEISER, a citizen of the United States of America, and resident of Brooklyn, county of Kings, State of New York, have invented certain new and useful Improvements in and Relating to Moisteners for Stamps, Envelopes, Tape, Etc., of which the following is a specification.

This invention relates to certain improvements in moisteners for stamps, envelopes, binding tape and the like; and the objects and nature of the invention will be readily understood by those skilled in the art in the light of the following explanation of the accompanying drawings illustrating what I now believe to be the preferred mechanical expression or embodiment of my invention from among other forms, constructions and arrangements within the spirit and scope of the invention.

An object of the invention is to provide a desk (or other) ornament to serve the purpose of a moistener for stamps etc. by reason of novel structural features.

A further object of the invention is to provide a statuette or model of a human or animal figure forming a liquid reservoir and having an exposed accessible tongue forming a stamp and envelope moistening surface in capillary communication with the liquid in said reservoir.

With these and other objects in view, the invention consists in certain novel features in construction and in combinations and arrangements as more fully and particularly set forth and specified hereinafter.

Referring to the accompanying drawings:

Fig. 1 is a perspective view of a statuette or model of a figure, embodying my invention, dotted lines indicating the wick depending in the reservoir formed by the body of the statuette.

Fig. 2 is a vertical section.

Fig. 3 is a detail view of the wick, broken away at the central portion.

In the drawings, I show the figure of an animal in a natural upright position with the head tilted slightly upwardly and the mouth open, the tongue being exposed and extended in a most natural manner. The figure shown happens to be that of a dog in a familiar position, although models or statuettes of human, animal, and other figures can be utilized for my purposes.

In the example illustrated, the portable statuette embodies a flat stand or base 1, and the body of the figure rises from and merges into this base and is preferably cast in one piece therewith. The body 2 of the figure is hollow to form a water or other liquid reservoir 3 and is preferably formed by a casting of any suitable metal, open at the upper end, approximately at the neck portion of the dog. The hollow cast body thus provides a water reservoir having a top filling opening 4.

The head 5 of the dog or other figure is also preferably composed of a hollow metal casting, open at the lower end (or neck) and formed, at 6, to detachably engage with the upper end or neck of the body 1, and thereby unite the head and body by a suitable detachable joint. If so desired, said interfitting neck portions of the body and head can be detachably secured together by a screw threaded joint. The head of the figure represents the mouth of the animal as open and thus provides an outlet or top opening 7 into the interior chamber of the hollow head which opens into the water reservoir of the body.

The lower jaw 8 of the animal's mouth projects outwardly approximately horizontally and carries a thin metal plate 9 (integral with or cast in the head) forming a tongue that projects forwardly approximately horizontally but usually with a slight upward continuation to form a support. This tongue portion 9, projects forwardly a substantial distance beyond the upper jaw or nose 10 of the mouth. For instance, the tongue portion projects forwardly say about one inch beyond the nose in a statuette that is about eight inches high. This tongue portion is usually centrally and longitudinally depressed at its top surface to provide a top curb at its outer end and side edge portions so that the longitudinal depression within the curb drains longitudinally into the head and so back to the water reservoir.

This metal tongue portion of the head forms a support for the exposed accessible fibrous or fabric tongue 12. This tongue 12 is formed by the upper end of a long wick 13 extending through the mouth and head of the figure and depending in the body thereof so that its lower end portion is submerged in the liquid in the reservoir. As at present advised by experience, this wick is preferably composed of a strip of red felt to simulate the natural color of the tongue. The wick is secured at its upper end in any suitable manner so as to be carried by the head. For instance, the tongue (wick) can be secured by the bent down ends of a wire 14, extending transversely through a hole in the lower jaw. This wire can be cast in the jaw with the wire ends projecting or a hole can be formed in the jaw to receive a removable wire of staple so that the tongue can be secured and released by bending the wire down on and up from the top surface of the fabric tongue. By this arrangement, the tongue and wick can be easily applied and removed, particularly as it may be desirable to remove the tongue at intervals for cleaning or renewing.

By capillary action, the exposed tongue of the wick will be kept moist so long as the lower portion of the wick is submerged in the liquid in the body. The shape of the tongue portion of the head casting, prevents dripping from the tongue at the exterior of the mouth or jaw of the head. The top surface of the constantly wet fabric tongue is exposed beyond the upper jaw and nose, and hence is readily accessible for the application of stamps, envelopes, and etc. thereto for moistening.

The statuette is preferably colored or painted in natural or lifelike tints, and is designed as an attractive desk or other ornament, with the strikingly colored tongue for moistening purposes.

It is evident that various changes, modifications and variations might be resorted to without departing from the spirit and scope of my invention and hence I do not wish to limit myself to the exact disclosures hereof.

What I claim is:

1. A moistener consisting of an ornamental figure or statuette hollow to provide a water reservoir and having a hollow head portion with a protruding tongue part, a wick secured to the tongue portion and depending into the reservoir, the end of the wick resting on the tongue portion and exposed and accessible at its upper surface.

2. A moistener composed of an ornamental hollow figure forming a water reservoir and having an open mouth and protruding tongue portion depressed at the top to drain into the reservoir, absorbent material resting on said tongue portion and exposed and accessible at its upper surface and having a wick extending into the water reservoir, and a fastening for detachably securing said material to said tongue portion.

3. A moistener for stamps, tape, envelopes and the like, comprising a hollow body providing a liquid reservoir and a head portion for said body, said head portion having a mouth the lower rigid jaw of which is projected outwardly to render its upper side accessible, said head portion having a wick passage leading inwardly from the upper side of said jaw to the interior of the body, and a wick adapted to rest on the upper side of said jaw and extend through said passage into the liquid space in the body, the portion of the wick on said jaw having its upper surface exposed and accessible from above and sustained against downward pressure by said jaw.

4. A moistener comprising an ornamental figure having a hollow body providing a liquid reservoir and a head having an open mouth with a rigid lower jaw, and a wick having a portion on the top surface of said jaw and upheld thereby against downward pressure thereon and accessible and exposed at its top surface to there receive articles to be moistened, said wick extending through said head into the liquid reservoir, the portion of the wick on said jaw simulating a tongue in a natural position in said mouth.

5. A moistener comprising an ornamental figure with an open mouth disclosing a tongue protruding and accessible from above to contact with downwardly pressed articles to be moistened, said figure providing a liquid reservoir, and a removable wick depending therein and extending into said mouth and forming said tongue, said tongue being upheld against downward pressure and exposed at its top surface.

6. A moistener embodying a vessel having a rigid exterior lateral projection accessible from above, said moistener providing a liquid reservoir and an interior wick passage from said projection to the liquid reservoir, the upper side of said projection forming a wick seat in longitudinal continuation of said passage, and a wick adapted to extend from said reservoir through said passage and longitudinally of and terminating on said seat with the top surface of the portion of the wick on said projection accessible from above to contact with and moisten articles pressed downwardly thereon.

CHARLES WILLIAM BEISER.